(12) United States Patent
Wilson

(10) Patent No.: US 8,840,010 B2
(45) Date of Patent: Sep. 23, 2014

(54) REUSABLE BOX CLOSURE FOR HOLDING BOX FLAPS

(75) Inventor: Jack D. Wilson, Jefferson, WI (US)

(73) Assignee: Eco-Latch Systems LLC, Pewaukee, WI (US)

( * ) Notice: Subject to any disclaimer, the term of this patent is extended or adjusted under 35 U.S.C. 154(b) by 213 days.

(21) Appl. No.: 13/134,200

(22) Filed: Jun. 1, 2011

(65) Prior Publication Data

US 2011/0290869 A1    Dec. 1, 2011

Related U.S. Application Data

(60) Provisional application No. 61/396,675, filed on Jun. 1, 2011.

(51) Int. Cl.
*B65D 5/20* (2006.01)
*B65D 5/66* (2006.01)

(52) U.S. Cl.
CPC ................................. *B65D 5/6647* (2013.01)
USPC ............. 229/125.39; 24/556; 24/562; 24/563

(58) Field of Classification Search
USPC .......... 229/125.37, 125.39, 125.41, 125, 126; 24/546, 547, 556, 561, 562, 563
See application file for complete search history.

(56) References Cited

U.S. PATENT DOCUMENTS

| | | | |
|---|---|---|---|
| 933,454 A * | 9/1909 | Hudson | 229/125.39 |
| 2,568,373 A * | 9/1951 | Sweet | 24/561 |
| 2,879,097 A | 3/1959 | Hendee | |
| 3,221,977 A | 12/1965 | Pollert | |
| 3,276,663 A * | 10/1966 | Falconer | 229/125.39 |
| 4,761,935 A | 8/1988 | King et al. | |
| 5,743,461 A * | 4/1998 | Timmins | 229/125.39 |
| 6,230,965 B1 | 5/2001 | Dismukes | |
| 6,290,126 B1 | 9/2001 | Zudal | |
| 6,571,538 B2 | 6/2003 | Luby | |
| 6,619,013 B2 * | 9/2003 | Dismukes | 53/382.1 |
| 7,284,688 B1 | 10/2007 | Barsness | |
| D575,143 S * | 8/2008 | Kuo et al. | D8/394 |
| 7,854,372 B1 * | 12/2010 | Bartone, Sr. | 229/125.39 |
| 7,942,309 B2 * | 5/2011 | Liang | 229/125.39 |
| 2001/0002678 A1 * | 6/2001 | Luby | 229/125 |

\* cited by examiner

*Primary Examiner* — Gary Elkins

(57) ABSTRACT

A box closure device engages and holds the flaps of a box in their downward closed position. The device is constructed in a general "I" shape such that the top member is parallel and connected to a bottom member by a vertical member. It slides inward between the opposing flaps of a box from one (or either) side of the box with the "I-beam" connecting member of the device fitting in the space between the flaps. The top and bottom members are of sufficient length, width and depth to hold the box closed. The device gains further operative value when promotional or box content labels, business cards, displays, signage, décor, pictures or the like are applied to the surface of the top and/or bottom members of the said device.

4 Claims, 2 Drawing Sheets

REUSABLE BOX CLOSURE FOR HOLDING BOX FLAPS

CROSS-REFERENCE TO RELATED APPLICATIONS

This application claims the benefit of provisional patent application Ser. No. 61/396,675, filed 2011 Jun. 1 by the present inventor.

BACKGROUND

Prior Art

The following is a tabulation of some prior art that presently appears relevant:

| Pat. No. | Issue Date | Patentee |
| --- | --- | --- |
| 2,879,097 | Mar. 3, 1959 | Hendee |
| 3,221,977 | Dec. 7, 1965 | Pollert |
| 4,761,935 | Aug. 9, 1988 | King et al. |
| 6,230,965 | May 15, 2001 | Dismukes |
| 6,290,126 | Sep. 18, 2001 | Zudal |
| 6,571,538 | Jun. 03, 2003 | Luby |
| 7,284,688 | Oct. 23, 2007 | Barsness |

FIELD OF THE INVENTION

This invention relates to the closure of boxes that are commonly used in industry and by consumers for the packaging, transportation and storage of goods, during work-in-process phases of production for producers of manufactured parts and for general use in commerce. Historically and generally, most boxes are sealed with tape or other adhesive material along or under the flaps to hold them in a closed position. Once boxes are opened by cutting, tearing off or using another means of removing the adhesives or other closing mechanisms, they cannot be easily or quickly reclosed for further use without folding the flaps in a crisscross fashion or applying more adhesives. Additionally, it is not convenient to remove, replace or add contents to the box without a reusable box closure that allows easy ingress and egress. Individuals and businesses are rapidly becoming more aware of the need to conserve energy, reduce the use of paper, plastic and other packaging construction materials and minimize the production of waste transported to landfills. By allowing for the convenient and time efficient reuse of boxes before recycling them, this box closure device fills society's needs by providing the means for closing and reusing boxes without the damaging effects of adhesives, staples, strapping or the like.

DESCRIPTION OF THE RELATED ART

Although the shape of the box closure device may be similar to that of prior art, its design, rigidity, strength and utility are unique. Prior art utilizes adhesives, staples, strapping or other closure materials to hold flaps together. Most often, when a box is reclosed after opening, the flaps are folded in an overlapping fashion to interlink in a crisscross pattern for a convenient, but not tight, box flap closure. This damages the flaps, leaving them defaced, bent and weakened. If it is necessary to apply a label on the box, the usual procedure is to mark the box with a separate label, or write information on the box explaining its contents, again minimizing the reusability of the box. Much of the prior art has been unsuccessfully manufactured or unused due to flaws in effectiveness, convenience of use, manufacturing ease or other considerations.

ADVANTAGES AND SUMMARY OF THE INVENTION

The box closure device of this invention provides convenient insertion to close the flaps, thus, reducing the use of expensive materials and electrical or other sources of energy. It provides the means for reducing the one-time use of boxes and, instead, enhances their reuse by allowing for box closure as well as the opening and re-closure of box flaps while minimizing damage to them. The box closure device has a bottom holding member which extends under at least two opposing flaps of the box when the box flaps are in the closed position. It also has a top holding member which extends over the same two opposing flaps when they are in the closed position. It has an "I-beam" member that connects the top and bottom holding members and passes through the space created between the opposing flaps of the box. The top, bottom and connecting members are all integral parts of this box closure device. When the box closure device is used on both the top and bottom sides of a box, it is inserted on the box's bottom flaps in the same fashion as on the box's top flaps. The device may also include the means for holding one or more labels, business cards, displays, pictures, etc. of various lengths, widths or styles which can be adhered to the top and/or bottom members of the device minimizing damage to and, thus, maximizing the reuse of boxes.

The bottom holding member may extend a greater distance away from the connecting member and toward the edges of the box which are parallel to the connecting member. Likewise, the top holding member may extend a greater distance away from the connecting member and toward the edges of the box which are parallel to the connecting member. The means or "beam" for connecting the top and bottom holding members may extend beyond the front and/or back edges of the top member which are the edges positioned perpendicularly to the connecting member so as to facilitate insertion into the space formed between the opposing flaps. The lower and connecting members of the device may extend beyond the upper member to create a guideline and platform that allows the closure device to enter the gap between and spaces under the box flaps into which it is being inserted.

The top and bottom holding members are attached to each other via the connecting member in a manner that provides the means for holding one or more labels while being manufactured, preferably during a one-stage process. The box closure device is a separate device from the box and may be produced by one or more processes via, but not limited to, injection molding, extrusion, pultrusion, etc. The box closure device is formed using a material rigid enough to accommodate and hold the flaps of various box thicknesses while at the same time being sufficiently flexible for simple insertion and removal of the device. The top and bottom holding members may be formed into lengths that are equal to or less than a full dimension across the length of the box. Likewise, the top and bottom holding members are formed into widths which are equal to or less than a full dimension across the width of the box. Generally, larger boxes will require a longer length or width version of this box closure device or multiple devices to fulfill the need for closing and holding the flaps of multiple lengths and/or widths of boxes.

The top holding member may be flat or may be arched in a downward direction with an apex point located at the connection between the top member and the connecting member to create downward pressure between the top and bottom members when the closure device is holding a box flap. The top member may contain ribs protruding downward to enhance strength, simplicity of insertion and gripping power.

The bottom member may be flat or may be arched in an upward direction to form upward pressure between the bottom and top members when the closure device is inserted between the flaps to hold them closed. The bottom member may have a leading edge that is beveled to facilitate the insertion into a space between opposing box flaps.

One embodiment of this device is already being manufactured and sold.

DRAWINGS

Figures

REFERENCE NUMERALS

| | |
|---|---|
| 1 | Top member |
| 2 | Bottom member |
| 3 | Connecting member |
| 4 | Gap |
| 5 | Leading Edge |
| 6 | Box Closure Device |
| 7 | Ribs |
| 8 | Alternative embodiment of device |
| 9 | Box |
| 10 | Box wall |
| 11 | Box flap |
| 12 | Space between box flaps |

DETAILED DESCRIPTION OF THE PREFERRED AND ALTERNATE EMBODIMENTS

Figure 1:
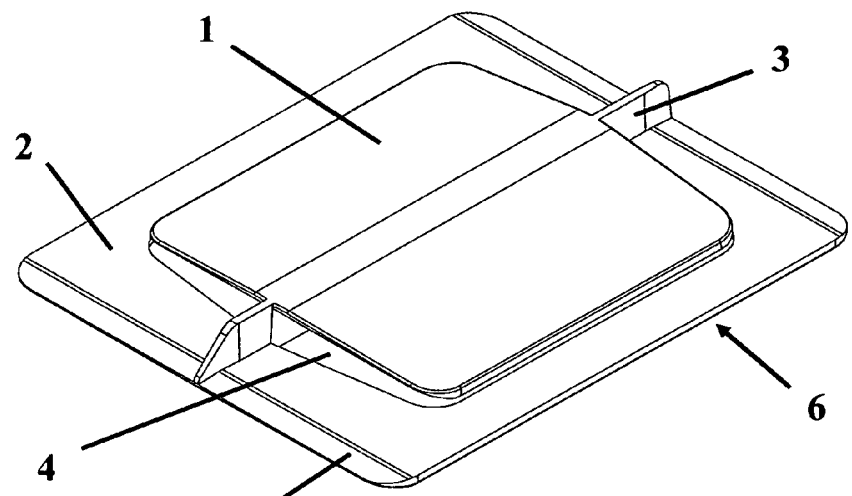
FIG. 1 shows an isometric view of the top of the preferred embodiment of the box closure device of this invention.
Figure 2:
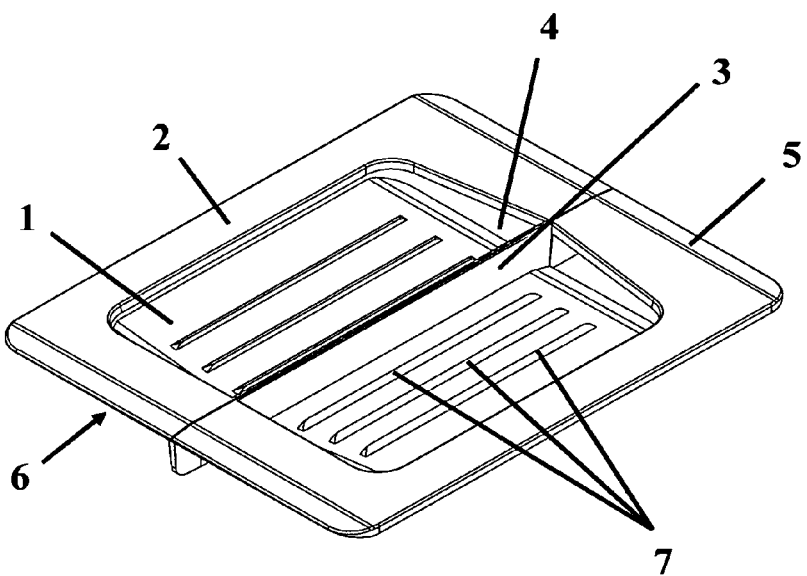
FIG. 2 shows an isometric view of the underside of the preferred embodiment of the box closure device as pictured in FIG. 1.
Figure 3:
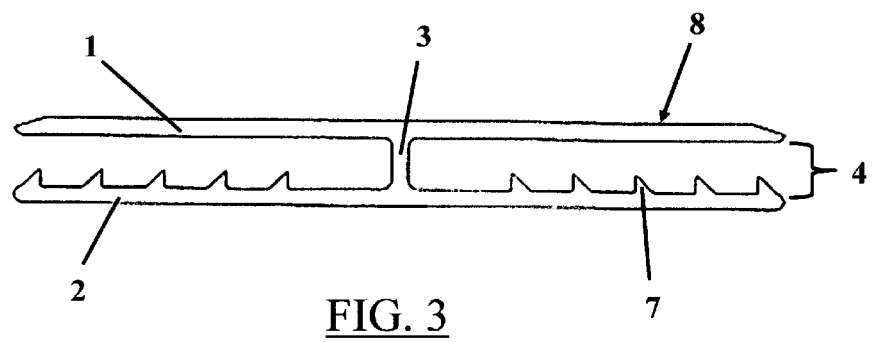
FIG. 3 shows a profile view of an alternate embodiment device of this invention.
Figure 4:
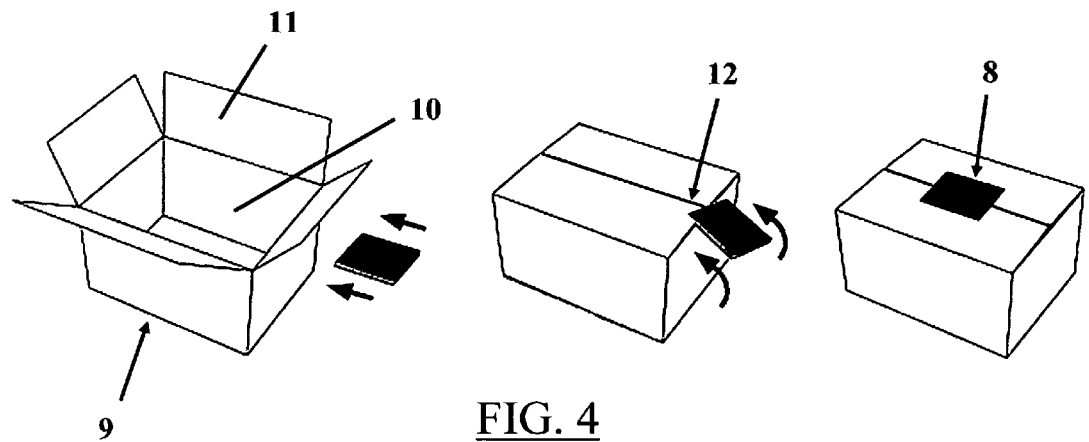
FIG. 4 shows a three-dimensional view of the entire alternate embodiment of the device of FIG. 2 being inserted in a box in a series of drawings.

Referring more particularly to FIGS. 1-4 wherein the like numbers refer to similar parts, the preferred embodiment of the box closure device 6 is shown in FIGS. 1 and 2 where it conveniently closes the box flaps 11 shown in FIG. 4. The conventional box 9 has four side walls 10, with separate flaps 11 extending from each side wall. Each flap 11 is typically equal to or less than one half the width of the box opening, so that at least two of the flaps meet at approximately the center of the box opening. Two flaps are thus overlain by the other two of the four flaps 11 which are closed with the box closure device 6.

The box closure device 6 is preferably formed via, but not limited to, injection molding, extrusion or pultrusion. As shown in FIG. 1, the device 6 has a top member 1 with a bottom member 2 that may extend beyond the length and/or width of the top member. The top and bottom members are joined by a connecting member 3 which forms a general and overall "I" shape of the device. The top member 1 may be round, oval or four or more sided and may be produced with ribs 7 positioned on the underside of the top member, shown in FIG. 2. Likewise, the bottom member 2 may be four or more sided. It may have ribs 7 as shown in an alternate embodiment of the box closure device 8 in FIG. 3. The top member 1 creates a gap 4 that may provide downward pressure for pressing down on the flaps 11. Likewise, the bottom member 2 creates a gap 4 that may provide upward pressure for pressing up on the flaps 11. The connecting member 3 may extend beyond the length of the top member 1 to facilitate the insertion into a space between the box flaps 12.

The top member 1 and/or bottom member 2 provide the means for holding a label. Generally, the label on the top member 1 is positioned in the center of the said member. Various label sizes, styles of business cards, displays, signage, décor, pictures, etc. may be applied to the box closure device 6 or the alternate embodiment of the device 8 and may be positioned in any fashion as long as there is enough surface area to support the entire length and width of the said items.

The bottom member 2 may have a beveled leading edge 5 which facilitates the insertion onto the flaps 11. As shown in FIG. 1, the leading edge 5 of the bottom member 2 functions as a guide for insertion of the device into the space between the opposing box flaps 12. FIG. 4 shows an alternate embodiment of the box closure device 8 being inserted into a box 9 in a series of three drawings. The insertion of the device is generally done in a single motion during which the gap 4 between the top member 1 and bottom member 2 provides the means for the passage of device through the space between the box flaps 12. The alternate embodiment of the box closure device 8 is then positioned into place generally by sliding the device between the opposing box flaps 11 which it is holding as shown in the middle and far right drawings of FIG. 4. The process of sliding the preferred embodiment of the device 6 into the closed position is much the same as that of the alternate embodiment 8.

Although the description above contains many specificities, these should not be construed as limiting the scope of the embodiments but as merely providing illustrations of some of several embodiments. For example, the closure's top or bottom holding members can have different shapes, such as circular, oval, trapezoidal or triangular or they can be the same in size; the connecting member can be the same length as the top member; and ribs can be added to one or more members of the device.

Thus the scope of the embodiments should be determined by the appended claims and their legal equivalents, rather than by the examples given.

In reference to the Request for Claim Drafting by Examiner Under MPEP 707.07(j) please draft any additional claims if this application contains any allowable subject matter.

I claim:

1. A multipurpose box closure device for holding closure flaps on a box in a closed position, comprising:
    an I-beam shape including a top member, a bottom member and a middle connecting member forming two recesses for receiving said closure flaps, wherein,
    said top member or said bottom member including a plurality of elongated ribs within said recesses, each of said ribs including a cross section having a flat inner surface generally parallel to said middle connecting member, an angled outer surface and an outer edge, said inner and outer surfaces intersecting at said outer edge.

2. A multipurpose box closure device for holding closure flaps on a box in a closed position, comprimising:
    an I-beam shape including a top member, a bottom member and a middle connecting member forming two recesses for receiving said closure flaps wherein, said top member including a plurality of ribs within said recesses, said bottom member including an aperture extending across said recesses and opposing said ribs, said middle connecting member extending across said aperture in said bottom member and connected to said bottom member at ends of the middle connecting member to connect said top member to said bottom member.

3. A method of making a box closure device for holding closure flaps on a box in a closed position, comprising:

forming an I-beam shape including a top member, a bottom member and a middle connecting member thereby providing two recesses for receiving said closure flaps, forming said top member or said bottom member with elongated ribs within said recesses, each of said ribs including a cross section having a flat inner surface generally parallel to said middle connecting member, an angled outer surface and an outer edge, said inner and outer surfaces intersecting at said outer edge.

4. A method of using a box closure device for holding closure flaps on a box in a closed position, comprising:

providing a box closure device having an I-beam shape including a top member, a bottom member and a middle connecting member forming two recesses, wherein, said top member or said bottom member including a plurality of elongated ribs within said recesses, each of said ribs including a cross section having a flat inner surface generally parallel to said middle connecting member, an angled outer surface and an outer edge, said inner and outer surfaces intersecting at said outer edge, sliding said box closure device onto said box closure flaps with each of said recesses receiving one of said closure flaps and said middle connecting member and said ribs sliding along said flaps.

\* \* \* \* \*